Nov. 1, 1966  RYOSUKE YOKOTA ETAL  3,283,152

OPTICAL SYSTEM FOR USE WITH FLUOROGLASS DOSIMETERS

Filed Dec. 11, 1963

United States Patent Office 3,283,152
Patented Nov. 1, 1966

3,283,152
OPTICAL SYSTEM FOR USE WITH
FLUOROGLASS DOSIMETERS
Ryosuke Yokota, Yokohama, and Saburo Nakajima, Kawasaki-shi, Japan, assignors to Tokyo Shibaura Electric Co., Ltd., Kawasaki-shi, Japan, a corporation of Japan
Filed Dec. 11, 1963, Ser. No. 329,690
Claims priority, application Japan, July 8, 1963, 38/35,165
2 Claims. (Cl. 250—71.5)

The present invention generally relates to fluoroglass dosimeters, and more particularly to an improvement in an optical system of the dosimeters of the type whereby ultraviolet rays are effectively projected on the fluoroglass for improved measurement of an exposure dose at a high degree of accuracy.

The fluoroglass dosimeter is a radiation dosimeter which takes advantage of radiophotoluminescence of phosphate glass containing silver, that is, silver-activated phosphate glass. When the silver-activated phosphate glass is exposed to radiation, a photochemical reaction takes place in the glass and an innumerable number of luminescent centers are formed therein to emit stable fluorescence by the excitation by ultraviolet light. Since the number of luminescent centers is rectilinearly proportional to the exposure dose, the exposure dose can be obtained by the measurement of the quantity of such fluorescence. When, for example, dosimeter glass comprising 50 parts of aluminum metaphosphate, 50 parts of lithium metaphosphate, 7 parts of silver metaphosphate and 3 parts of boric anhydride is exposed to ultra-violet light of a wave length in the vicinity of 365 m$\mu$ which is taken out of a mercury-arc lamp through a filter, orange luminescence of intensity proportional to the exposure dose is generated in the glass. This orange luminescence is received by a photomultiplier through a filter which is adapted to transmit the light of a greater wave length than 585 m$\mu$, and a photo-electric current output thereof is measured after amplification. However, conventional fluoroglass dosimeters of the type are defective in that, although they can handle the measurement of a dose as low as 30 mr. for gamma rays with a low degree of accuracy, it is of course a matter of impossibility for these conventional dosimeters to measure a dose below 30 mr.

Therefore, an object of the invention is to provide a fluoroglass dosimeter in which a light source of an exactly point-like shape for ultra-violet light is provided and in which dosimeter glass is exposed to comparatively intense ultra-violet light obtained by refraction and reflecting said ultra-violet light from the point source.

Another object of the invention is to provide a fluoroglass dosimeter in which any stray light produced in an optical system thereof is effectively eliminated and orange colored light free from such stray light is only passed to a photomultiplier.

Still another object of the invention is to provide a fluoroglass dosimeter which makes possible an accurate measurement of gamma rays of a low dose even under 30 mr.

According to the present invention, there is provided a fluoroglass dosimeter comprising a source of ultra-violet light, a first stop disposed at a focus of a lens system for condensing the light from said ultra-violet light source, a lens system for magnifying and making convergent rays by refracting the light having passed through said first stop, a block of dosimeter glass in the form of a rectangular parallelepiped disposed in an optical path of said magnifying lens system, a second stop disposed in front of said glass of rectangular parallelepiped for intercepting the incident light upon peripheral edges of a face of said rectangular parallelepiped, a mirror face disposed behind said glass of rectangular parallelepiped for reflecting the light having passed through said second stop, reflective mirrors for diverting outwardly of the optical path a portion of stray light included in the light having passed through said second stop, a photomultiplier for receiving fluorescence emitted in said glass of rectangular parallelepiped, and an instrument for measuring a photo-electric current output of said photomultiplier.

There are other objects and particularities of the invention which will be obvious from the following description with reference to the accompanying drawings, in which.

Figure 1:
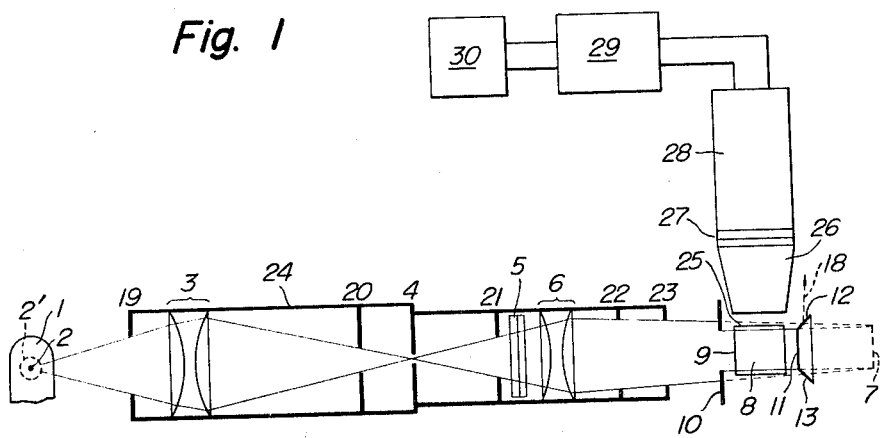
FIG. 1 is a diagrammatic arrangement of a fluoroglass dosimeter embodying the principle of the invention.

Referring now to FIG. 1, there is shown a fluoroglass dosimeter of the invention, comprising a light source which takes the form of a high brightness portion 2 of a discharge lamp 1 such as a mercury-arc lamp or xenon discharge lamp. Light from the light source 2 is condensed by a lens system 3, and a first stop 4 is placed at a position of the focus of the light. By the provision of said first stop 4, a point light source can be obtained by sufficiently stopping down an image at the focus even if the light source is not of a point-like nature, and it is further possible to eliminate substantial portions of stray light originated by the light emitted from a portion 2' lying about the high brightness portion 2. The light having passed through the first stop 4 is passed through a first filter 5 and subsequently magnified by a magnifying lens system 6 to form at a position 7 an image magnified relative to the size of the image of the stop 4, for example, about four times.

A block of dosimeter glass 8 (hereinafter to be referred to merely as glass) preferably in the form of a rectangular parallelepiped is placed in an optical path of the magnifying lens system 6 so as to receive rays of the light through a face 9 thereof. In front of the glass 8, there is disposed a second stop 10 in opposed relation with the face 9. Said second stop 10 acts to restrict a cross-sectional area of the light incident upon the glass 8, thus to intercept the incident light upon the peripheral edges of said face 9. By the provision of said second stop 10, approximately parallel rays of ultra-violet light can be obtained, which are incident upon the face 9 of the glass 8 in perpendicular relation thereto.

Now, it is assumed that the size of the opening of the first stop 4 is 1.7 millimeters by 1.0 millimeter, and this is magnified four times by the lens system 6. Then, an image of 6.8 millimeters by 4.0 millimeters would be formed at the position 7. Further, supposing that the rectangular parallelepiped glass 8 has dimensions of 8 millimeters by 8 millimeters by 4.7 millimeters, and the second stop 10 has an area of the opening of 6.8 millimeters by 4.0 millimeters. Then, the light with a rectangular plane of 6.8 millimeters by 4.0 millimeters is incident upon the rectangular plane 9 of 8 millimeters by 4.7 millimeters. It will therefore be known that the incident light upon the peripheral edges of the face 9 is thereby intercepted. (However, it is assumed that these two rectangular planes have a common center and are held at positions where opposite sides are parallelly disposed relative to each other.) By thus intercepting the incident light upon the peripheral portion of the face 9, the light will not project onto four faces, or upper, lower, left-hand side and right-hand side faces of the glass as well as a face of a glass holder (not shown). Therefore, there is no possibility of generating fluorescence even if foreign matters are attached to these faces.

Behind the glass 8, there is disposed a mirror face 11 for reflecting the light having passed through the second stop 10 and thus for intensifying the ultra-violet light in the glass 8. The mirror face 11 may preferably be disposed halfway between the second stop 10 and the imaginary position 7 in order that the image reflected by the mirror face 11 may coincide with an image by the second stop 10.

Figure 2:
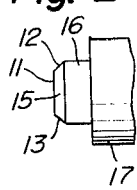
FIG. 2 is a side elevational view of an embodiment of a composite reflector used in an optical system of the invention.

In FIG. 1, inclined faces 12 and 13 provided adjacent the mirror face 11 are formed as reflective mirror faces. Such inclined faces are in no way limited to the two directions alone as shown in FIG. 2 and may be directed in other directions. Further, these inclined faces may not necessarily be disposed adjacent the mirror face 11. According to the invention, however, the inclined faces 12 and 13 may conveniently be formed integrally with the mirror face 11 because they both serve as reflective mirror faces.

Figure 3:
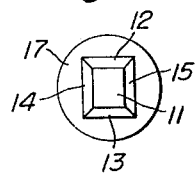
FIG. 3 is a front elevational view of the composite reflector of FIG. 2.

FIGS. 2 and 3 illustrate an embodiment of a composite reflector or mirror body wherein the quadrilateral mirror face and four mirror faces 12, 13, 14 and 15 adjacent thereto are formed on a face of a conventional glass block 16. The inclined faces may desirably make an angle of, for example, more than 135° with respect to the parallel rays of light passed through the second stop 10, and may be formed simultaneously with the mirror face 11 by vacuum evaporation of aluminum. The composite body so formed may conveniently be used by being fitted to a carrier 17 therefor. The inclined faces 12, 13, 14 and 15 are effective for eliminating a portion of the stray light, which may be included in said parallel rays of light and may adversely affect a photomultiplier as will be described later. The objectionable stray light so eliminated is led outwardly in the direction shown by arrow 18.

In the above optical system, there are shown a plurality of stops 19, 20, 21, 22 and 23, all of which are intended for an auxiliary service. Supposing that parallel rays are to be obtained by the lens system alone from the light of a point source. Since, however, an ideal point source is difficult to obtain, it is required that stops are provided along the optical path at, for example, the positions corresponding to said auxiliary stops and the size of each stop is made narrower than the area of the optical path at each position. This arrangement will however remarkably decrease the intensity of the parallel rays of light. Even with an ideal point source, it is impossible to obtain ideally parallel rays of light due to inevitable aberration in the lens system, and a higher degree of parallelism desired will result in lower light intensity.

The auxiliary stops of the invention are so sized that only those portions of beams running outside of the optical path are intercepted in order to keep the effective portion of ultra-violet light from being lost. According to the invention, the accuracy of measurement is improved by the arrangement that, of the stray light generated by the reflection in an outer casing 24 and passing through the second stop 10, the objectionable portion of the stray light which passes along the outer faces of the glass 8 is eliminated by the reflective mirror faces 12, 13, 14 and 15.

When the glass 8 exposed to radiation is placed in the optical system as shown in FIG. 1 and subjected to the parallel ultra-violet rays, fluorescence proportional to the exposure dose is emitted. The fluorescence is taken out of a side face 25 of the glass 8 and received by a photo-multiplier 28 through a condenser 26 of a rectangular across section and a filter 27. A photo-electric current output of the photo-multiplier 28 is amplified by an amplifier 29 and thence conducted into a measuring instrument 30 for measurement.

Now, description will be made on a more materialized basis with reference to the elements incorporated in the preferred embodiment of the optical system of FIG. 1. The preferred embodiment of the fluoroglass dosimeter may comprise the following particulars: ultra-violet light source of an ultra high pressure mercury-arc lamp of 70 to 100 watts; condenser lens in the lens system 3 of quartz glass having a diameter of 45 millimeters and a focal distance of 40 millimeters; magnifying lens in the lens system 6 having a diameter of 25 millimeters and a focal distance of 30 millimeters (four magnifications); first stop 4 of a size 1.7 millimeters by 1.0 millimeter; second stop 10 of a size 6.8 millimeters by 4.0 millimeters; mirror face 11 of a size 6.8 millimeters by 4.0 millimeters; distance between light source 2 and first stop 4 of 160 millimeters; distance between first stop 4 and imaginary position 7 of 192 millimeters which is the image of 4 with lens 6; filter 5 of interference type for transmitting wave lengths in the vicinity of 365 m$\mu$; filter 27 of reddish orange glass for transmitting wave lengths longer than 585 m$\mu$; glass 8 of a size 8 millimeters by 8 millimeters by 4.7 millimeters; nearly parallel or convergent ray receiving face 11 of glass 8 of a size 8 millimeters by 4.7 millimeters; fluorescence take-out face 25 of glass 8 of a size 8 millimeters by 8 millimeters; and angle of inclined mirror face with respect to parallel rays of 135°.

It will be understood that, according to the invention, a remarkably small amount of stray light will only reach the photomultiplier, and with the use of the optical system of the above embodiment, background of the measuring apparatus per se excluding the glass 8 will be reduced below 3 to 10 mr. in terms of an exposure dose of radiation. On the contrary, according to the conventional system wherein ultra-violet rays are concentrated on the dosimeter glass, background is in the order of 100 to 150 mr. in terms of an exposure dose. Further, according to the invention, there is no presence of fluorescence inducing errors in the measurement by virtue of the unique structure. Or more precisely, the ultra-violet light from the light source is made into the nearly parallel or convergent rays of a small loss and subsequently reflected to provide the light of high intensity, and, as no ultra-violet light is projected on the side faces of the glass and the holder therefor, no fluorescence which is the cause of error can be generated. Therefore, highly accurate results of measurement can be obtained even with a low exposure dose of gamma rays, for example, of less than 30 mr.

What is claimed is:

1. A fluoroglass dosimeter comprising a source of ultra-violet light, a first stop disposed at a focus of a lens system for condensing the light from said ultra-violet light source, a lens system for magnifying and making convergent rays by refracting the light having passed through said first stop, a block of dosimeter glass in the form of a rectangular parallelepiped disposed in an optical path of said magnifying lens system, a second stop disposed in front of said glass of rectangular parallelepiped for intercepting the incident light upon peripheral edges of a face of said rectangular parallelepiped thereby nearly parallel rays being obtained, a mirror face disposed behind said glass of rectangular parallelepiped for reflecting the light having passed through said second stop, reflective mirrors for diverting outwardly of the optical path a portion of stray light included in the light having passed through said second stop, a photomultiplier positioned out of the path of light from said last mentioned reflective mirrors for receiving fluorescence emitted in said glass of rectangular parallelepiped, and an instrument for measuring a photoelectric current output of said photomultiplier.

2. A fluoroglass dosimeter according to claim 1, wherein a composite mirror body comprising a quadrilateral mirror face and four inclined mirror faces adjacent thereto formed on a single glass block is disposed behind said second stop to serve a dual function of reflecting the light having passed through said second stop and eliminating a portion of stray light.

References Cited by the Examiner

UNITED STATES PATENTS

| | | | |
|---|---|---|---|
| 2,131,328 | 9/1938 | Michelssen | 250—71.5 X |
| 2,549,574 | 4/1951 | Condiff | 250—71.5 X |
| 2,916,625 | 12/1959 | Pemberthy | 250—83 |
| 2,934,651 | 4/1960 | Etzell et al. | 250—71.5 X |
| 3,079,835 | 3/1963 | Saperstien | 88—14 |

RALPH G. NILSON, *Primary Examiner.*

S. ELBAUM, *Assistant Examiner.*